United States Patent [19]

Hong

[11] Patent Number: 4,606,609
[45] Date of Patent: Aug. 19, 1986

[54] PROJECTION SCREEN

[76] Inventor: Sung K. Hong, San 111-1 Bijeon-Ri, Pyoung Taek-up, Kyunggi-Do, Rep. of Korea, 180

[21] Appl. No.: 764,416

[22] Filed: Aug. 12, 1985

[51] Int. Cl.$^4$ .................................... G03B 21/60
[52] U.S. Cl. .............................. 350/128; 350/167
[58] Field of Search .................... 350/127–129, 350/167, 265; 356/225

[56] References Cited

U.S. PATENT DOCUMENTS

| | | | |
|---|---|---|---|
| 893,060 | 7/1908 | Dobbins | 350/265 |
| 1,942,841 | 1/1934 | Shimizu | 350/128 |
| 1,943,995 | 1/1934 | Weld | 350/128 |
| 2,067,843 | 1/1937 | Tönnies | 356/225 |
| 3,180,214 | 4/1965 | Fox | 350/128 |
| 3,191,495 | 6/1965 | Miller | 350/128 |
| 3,704,055 | 11/1972 | Hong | 350/128 |
| 3,830,556 | 8/1974 | Bratkowski | 350/128 |
| 4,154,506 | 5/1979 | Yevick | 350/167 |
| 4,298,246 | 11/1981 | Iwamura | 350/129 X |

FOREIGN PATENT DOCUMENTS 751840  7/1933  France ................. 350/128

*Primary Examiner*—Richard A. Wintercorn
*Attorney, Agent, or Firm*—Rodman & Rodman

[57] ABSTRACT

The projection screen includes a plurality of optical unit cells arranged together to form a display surface of the screen. The optical units cells that are constituents of the projection screen each include an elongated body portion formed of a light transmissive, preferably transparent material. One end of the body portion is formed as a convex lens surface, and an opposite end is formed with a spherical surface contour, preferably a concave surface contour. A light diffusing material is provided at the axial portion of the convex lens surface and a light reflecting material is provided at the axial portion of the spherical concave surface, with the light reflecting material having a reflecting surface directed toward the convex lens surface. The axial distance between the convex lens surface and the reflecting material is less than the focal distance of the convex lens such that light passing through the convex lens surface converges toward the focal point beyond the reflecting material and is reflected by the reflecting material, before reaching the focal point, through the light diffusing material on the convex lens.

12 Claims, 4 Drawing Figures

PROJECTION SCREEN

BACKGROUND OF THE INVENTION

This invention relates to projection screens for displaying an optical image, and more particularly to a projection screen formed of a matrix of optical unit cells.

The display of images on a projection screen is generally carried out under conditions of relatively low ambient light in comparison to the intensity of the light issuing from a projector.

If the surrounding light were relatively bright in comparison to the projected light, an insufficient lighting contrast condition might exist whereby the projected light would appear dull and indistinct, making it difficult for a viewer to perceive the images on the projection screen.

However, if the projected light can be focused at discrete locations on a projection screen, then the intensity of light provided by the projector can be maintained at a sufficient level to permit a distinctive display of images, even under conditions of relatively bright ambient light. To accomplish a desired focusing of light, I provide a projection screen formed of a matrix of optical unit cells that individually function as separate lenses which focus light onto discrete portions of the cell surface containing a light diffusing material.

The collective cell surfaces in the matrix cooperate to define the image display surface of the projection screen, such as shown in my U.S. Pat. No. 3,704,055. Each of the disclosed cells in this patent include a light converging lens spaced a predetermined distance from a concave reflecting mirror that reflects the light through a light diffusing material on the lens surface.

The focal point of the lens is selected to lie intermediate the lens surface and the reflecting mirror. A plane of opaque material surrounds the periphery of the concave reflecting mirror. Consequently, a compound surface must be formed, which includes a concave axial surface that is coated to provide the characteristics of a concave mirror, and a surrounding planar surface that is coated with opaque material.

It has been found that the equipment needed to produce the previously described optical cell is quite sophisticated and requires a high level of operator skill. Consequently, the manufacture of such an optical cell is not sufficiently cost effective to complete with other known projection screens that lack the advantages of the projection screen shown in my patent.

It is thus desirable to provide a projection screen formed of optical unit cells that is substantially more economical to produce than the known projection screen with optical unit cells. It is also desirable to provide a projection screen formed of optical unit cells that includes a reflection mirror having the same contour or surface characteristics as the surrounding surface with the opaque material, thereby eliminating the need to provide a compound surface for the mirror and the opaque material which surrounds the mirror.

OBJECTS AND SUMMARY OF THE INVENTION

Among the several objects of the invention may be noted the provision of a novel project screen, a novel projection screen that includes a matrix of optical unit cells, a novel optical unit cell for a projection screen, a novel optical unit cell that includes a reflection mirror and a surrounding surface which all have the same surface contour, a novel optical unit cell wherein the lens surface and reflecting mirror are distant from each other by an amount that is less than the focal length of the lens surface.

Other objects and features of the invention will be in part apparent and in part pointed out hereinafter.

In accordance with the present invention, the projection screen includes a plurality of optical unit cells juxtaposed together to form a matrix, and thereby define a surface of the screen.

Each of the unit cells includes an elongated body portion formed of a light transmissive material, the body portion having one end formed as a convex lens surface, and an opposite end formed as a spherical surface. The convex lens surface and the spherical surface have coincident axes. A light diffusing material is provided at the axial portion of the convex lens surface and a light reflecting material is provided at the axial portion of the spherical surface.

Opaque material surrounds the reflecting material at the spherical surface, and the light reflecting material has a reflecting surface directed toward the convex lens surface. The axial distance between the convex lens surface and the reflecting material are less than the focal distance of the convex lens such that light passing through the convex lens surface converges toward a point beyond the reflecting material. The reflecting material can thus reflect the light back toward the light diffusing material at the convex lens surface.

The elongated body portion of the unit cell is formed with at least one pair of opposite parallel planar surfaces that extend from the convex lens surface to the spherical surface to permit juxtaposition of the cells in a predetermined plurality of rows and columns, to form the matrix of the cells and define the screen surface. A light absorbing material is also provided on the elongated surfaces that extend from the convex lens surface to the spherical surface of the unit cells.

Under this arrangement, light passes through the lens surface of each optical cell and is reflected back to a diffusing material provided at an axial portion of the lens surface for viewing purposes. Since the reflecting surface and the surface which surrounds the reflecting surface have similar surface characteristics, such as being formed as a spherical surface, only one machining operation is necessary to generate said surface.

The invention accordingly comprises the constructions hereinafter described, the scope of the invention being indicated in the claims.

DESCRIPTION OF THE DRAWINGS

In the accompanying drawings, in which a preferred embodiment of the invention is illustrated.

Corresponding reference characters indicate corresponding parts throughout the several views of the drawing.

DETAILED DESCRIPTION OF THE INVENTION

Figure 4:
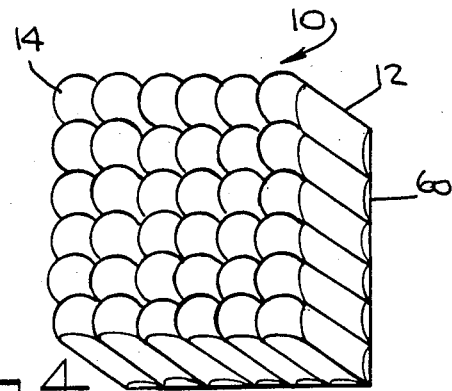
FIG. 4 is a schematic fragmentary view of a matrix of optical unit cells which form the projection screen.

A projection screen incorporating a preferred embodiment of the invention is generally indicated by the reference number 10 in FIG. 4.

The projection screen 10 includes a plurality of optical unit cells 12 juxtaposed together to form a display surface 14 of the screen.

Figure 3:
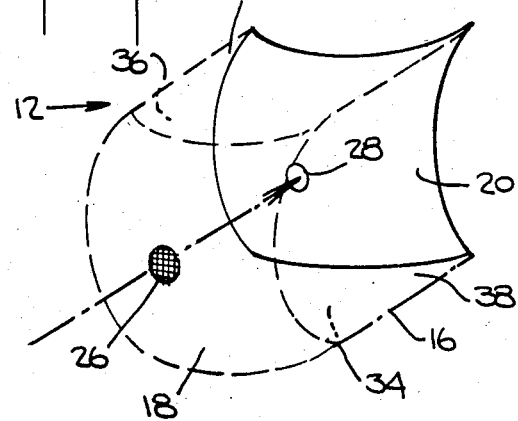
FIG. 3 is a perspective view thereof.

Each of the optical unit cells 12 (FIGS. 3 and 4) is formed of any suitable known, but preferably transparent, light transmissive material. The unit cell 12 has an elongated body portion 16 with a spherical convex lens 18 formed at one end and a spherical surface 20 formed at an opposite end. Preferably the spherical surface 20 is concave. The lens 18 and the concave surface 20 have predetermined radii of curvature.

The principal axis of the lens 18, which is coincident with the principal axis of the concave surface 20, is designated 22. The maximum extent of the convex lens 20 is approximately equivalent to the maximum extent of the concave surface 20. Thus, although not shown, a projection of the convex lens surface 18 onto a plane perpendicular to the axis 22 is substantially coextensive with a projection of the concave surface 20 onto the same plane.

The distance between the lens 18 and the spherical concave surface 20 is selected such that the principal focus 24 of the lens 18 is disposed beyond the concave surface 20 on the principal axis 22.

A generally circular light diffusing area 26 is provided on the lens 18 at the principal axis 22. The diffusion characteristics of the area 26 can be obtained in any suitable known manner as by frosting, etching or providing a thin film of minute light scattering particles.

A corresponding generally circular reflective area 28 is provided on the concave surface 20 at the principal axis 22. The reflective area 28 comprises a reflecting material such as silver or aluminum on the inside of the surface 20. Thus, the reflecting area 28 constitutes a convex reflecting surface directed toward the lens 18. The remainder of the concave surface 20 surrounding the reflective area 28 is coated with any suitable opaque, light absorbing material 30, such as flat black paint.

The body portion 16 of the cell 12 can be of rectangular cross section such that opposite surfaces 32 and 34 are parallel to each other and generally perpendicular to the opposite parallel surfaces 36 and 38. Preferably the side surfaces 32, 34, 36 and 38 extend from the lens 18 to the concave surface 20 and are covered with an opaque, light absorbing material such as flat black paint.

Figure 2:
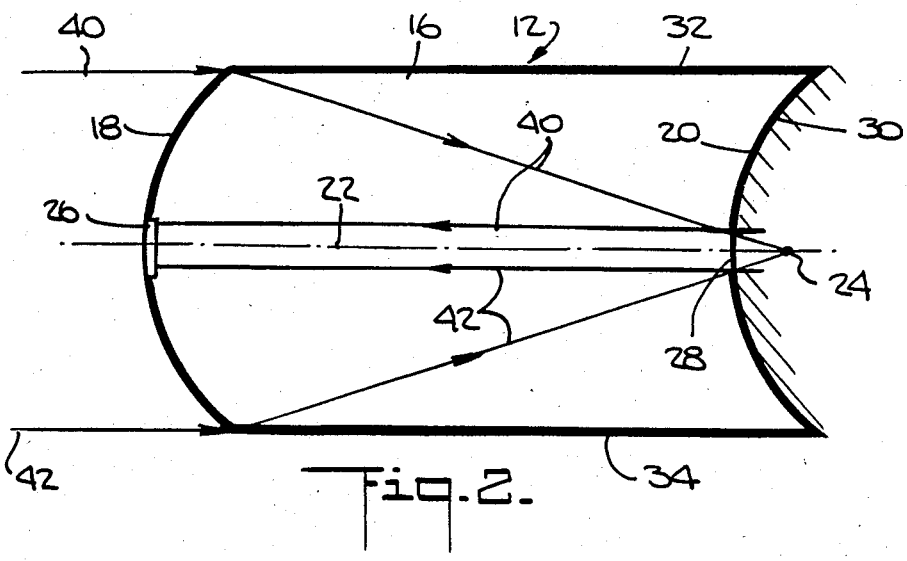
FIG. 2 is a schematic profile unit of an optical unit cell incorporated in the projection screen of the present invention.

Referring now to FIG. 2, it can be seen that light rays such as 40 and 42, that are generally parallel to the principal axis 22, are converged by the lens 18 toward the focal point 24 beyond the reflecting surface 28. Before the light rays 40 and 42 can reach the focal point 24, they are reflected by the reflecting surface 28 back toward the diffusing portion 26 of the lens 18. The radius of curvature of the lens 18 and of the concave surface 20 are selected such that light rays reflected from the reflecting surface 28 are rendered substantially parallel to the principal axis 22 and thus strike the diffusion area 26.

Any light rays that strike the lens 18 in such a direction so as to be converged away from the focal point 24 will strike the opaque portion of the concave surface 20 and are thus essentially absorbed by the opaque material on the surface 20. Light rays (not shown) that are converged toward the side surfaces 32, 34, 36 and 38 are likewise absorbed by the opaque light absorbing material that is coated on each of the side surfaces.

The optical unit cell 12 thus inhibits the reflection of ambient light back to the lens surface 18, yet maximizes the reflection of projected light from a projection source (not shown) through the diffusion area 26.

Since the display surface 14 is constituted by a plurality of the lenses 18 corresponding to the optical unit cells 12 that are arranged together in rows and columns as shown in FIG. 4, the projection screen 10 provides optimal reflection of light from a projector through the diffusion areas 26 and minimal reflection of ambient light through any portion of the surface of the lens 18.

Figure 1:
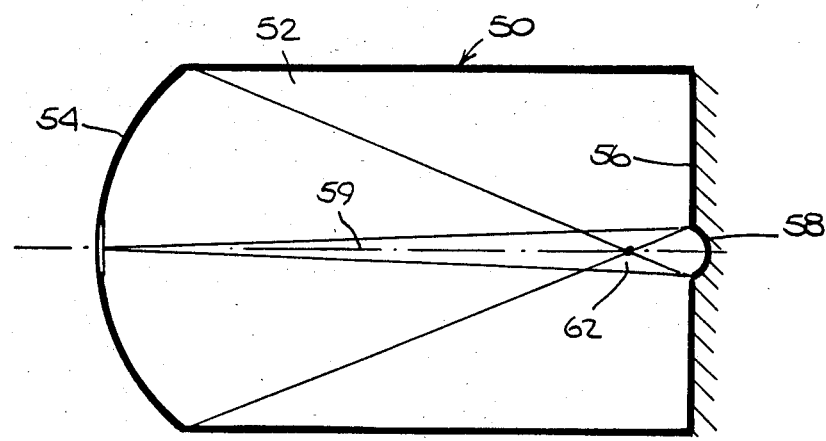
FIG. 1 is a schematic profile view of a prior art optical unit cell.

Some advantages of the present invention will be readily apparent from a comparison with a prior art optical unit cell 50 as shown in FIG. 1, which is of the type disclosed in my U.S. Pat. No. 3,704,055. The cell 50 comprises an elongated lens body 52 having a spherical convex lens surface 54 formed at one end thereof and a nonspherical surface 56 formed at an opposite end thereof. A concave mirror 58 is provided at the surface 56 such that a principal axis 60 of the lens 54 passes through the vertex of the mirror 58 and the focal point 62 of the lens 54 is coincident with the focal point of the mirror 58.

Since the surface 56 is not concave and the mirror 58 is concave, a complex manufacturing operation is required to establish the surface 56 in cooperative arrangement with the concave mirror 58. Furthermore, the alignment of the focal point of the mirror 58 with the focal point of the lens 54 requires extremely precise manufacturing tolerances for the optical unit cell 50.

In the present optical unit cell 12, the surface 20 is not a compound surface, but a simple concave surface which can be easily machined. Furthermore, the reflective area 28 can be easily made by plating reflective material only to the portion of the surface 20 where the source light is to be reflected, and such plating operation can be accomplished with well known optical methods. In addition, the focal point of the lens 18 need not coincide with the focal point of the reflective surface 28. Also, a projection screen comprised of the unit cells 12 may have a planar substrate such as indicated by reference number 60 in FIGS. 3 and 4. If desired, the reflecting mirror 28 and the light diffusing material 26 can be applied to the unit cells after they have been arranged together to form the screen 10.

In view of the above, it will be seen that the objects of the invention are achieved and other advantageous results attained.

As various changes can be made in the above constructions without departing from the scope of the invention, it is intended that all matter contained in the above description or shown in the accompanying drawing shall be interpreted as illustrative and not in a limiting sense.

What is claimed is:

1. An optical unit cell for a projection screen comprising,
   (a) a elongated body portion formed of a light transmissive material,
   (b) said body portion having one end formed as a convex lens surface, and an opposite end formed with a predetermined spherical surface countour, said convex lens surface and said spherical surface having coincident axes and predetermined radii of curvature such that a projection of said convex lens surface onto a plane perpendicular to said coincident axes is substantially coextensive with a projection of said spherical surface onto said plane, (c) a light diffusing material provided at the axial portion of said convex lens surface, and a light reflecting material provided at the axial portion of said spherical surface, said light reflecting material having a reflecting surface directed toward said convex lens surface.

2. The optical unit cell as claimed in claim 1 wherein said spherical surface is a concave spherical surface.

3. The optical unit cell as claimed in claim 2 wherein said convex lens surface has a first focal distance, and the axial distance between said convex lens surface and said reflecting material is less than the focal distance of said convex lens, such that light passing through said convex lens surface converges toward the focal point beyond said reflecting material and is reflected by said reflecting material, before reaching said focal point, through the light diffusing material on said convex lens.

4. The unit cell as claimed in claim 2, wherein opaque light absorbing material surrounds the reflecting material at said spherical concave surface.

5. The unit cell as claimed in claim 1, formed with at least one pair of opposite parallel planar surfaces extending from said convex lens surface to said concave surface, and opaque light absorbing material is provided on the parallel planar surfaces.

6. The optical unit cell as claimed in claim 1, wherein said reflecting material comprises a plating on said spherical surface.

7. The optical unit cell as claimed in claim 3 wherein the radial extent with respect to said axis of said light diffusing material and the radial extent with respect to said axis of said reflecting material are selected to permit substantially all of the light reflected from said reflecting material to pass through said diffusing material.

8. A projection screen comprising,
(a) a plurality of optical unit cells juxtaposed together to define a surface of the screen,
(b) said unit cells including,
(i) an elongated body portion formed of a light transmissive material,
(ii) said body portion having one end formed as a convex lens surface, and an opposite end formed with a predetermined spherical surface contour, said convex lens surface and said spherical surface having coincident axes and predetermined radii of curvature such that a projection of said convex lens surface onto a plane perpendicular to said coincident axes is substantially coextensive with a projection of said spherical surface onto said plane,
(iii) a light diffusing material provided at the axial portion of said convex lens surface, and a light reflecting material provided at the axial portion of said spherical surface, and wherein opaque material surrounds the reflecting material at said spherical surface,
(c) said unit cells being formed with at least one pair of opposite parallel planar surfaces extending from said convex lens surface to said concave surface, and light absorbing material is provided on the parallel planar surfaces to permit juxtaposition of said cells in a predetermined plurality of rows and columns to define said screen surface.

9. The projection screen as claimed in claim 8 wherein said spherical surface is a concave spherical surface.

10. The projection screen as claimed in claim 9 wherein the axial distance between said convex lens surface and said reflecting material is less than the focal point of said convex lens such that light passing through said convex lens surface converges toward a point beyond said reflecting material, and is reflected by said reflecting material through the light diffusing material on said convex lens.

11. The projection screen as claimed in claim 10, including a planar support surface for supporting said plurality of cells at said opposite ends thereof such that the diffusing material of said lenses is substantially coplanar.

12. The projection screen as claimed in claim 10 wherein the radial extent of said light diffusing material with respect to said axis and the radial extent of said reflecting material with respect to said axis are selected to permit substantially all of the light reflected from said reflecting material to pass through said diffusing material.

* * * * *